United States Patent
Odean et al.

(10) Patent No.: US 9,391,861 B1
(45) Date of Patent: Jul. 12, 2016

(54) SERVER SIDE EXPERIMENTATION FOR CLIENT SIDE SOFTWARE

(71) Applicant: Google Inc., Mountain View, CA (US)

(72) Inventors: Tyler William Odean, San Francisco, CA (US); Marc-André Decoste, Candiac (CA); Jesse Doherty, Montreal (CA); Vadim Berman, Belmont, CA (US); Alexei Iourievich Svitkine, Montreal (CA); Steven Chi Truong, Montreal (CA); Ilya Mikhailovich Sherman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 222 days.

(21) Appl. No.: 13/963,986

(22) Filed: Aug. 9, 2013

Related U.S. Application Data

(60) Provisional application No. 61/798,507, filed on Mar. 15, 2013.

(51) Int. Cl.
*G06F 15/173* (2006.01)
*H04L 12/26* (2006.01)

(52) U.S. Cl.
CPC .................................. *H04L 43/0876* (2013.01)

(58) Field of Classification Search
CPC .................................. G06F 11/00; G06F 11/36
USPC .......... 709/203, 217, 220, 230; 717/124, 168, 717/170, 174
See application file for complete search history.

(56) References Cited

U.S. PATENT DOCUMENTS

| | | | |
|---|---|---|---|
| 2006/0010163 A1* | 1/2006 | Herzog | G06Q 40/12 |
| 2010/0306773 A1* | 12/2010 | Lee et al. | 718/1 |
| 2011/0238496 A1* | 9/2011 | Gurbuxani et al. | 705/14.49 |
| 2012/0239170 A1* | 9/2012 | Kulathu | G05B 19/0426 700/83 |
| 2013/0232246 A1* | 9/2013 | Miller | G06F 9/44505 709/222 |
| 2014/0095872 A1* | 4/2014 | Root et al. | 713/168 |
| 2014/0289719 A1* | 9/2014 | Dewan | 717/170 |
| 2015/0081764 A1* | 3/2015 | Zhao et al. | 709/203 |

* cited by examiner

*Primary Examiner* — Michael Y Won

(74) *Attorney, Agent, or Firm* — McDermott Will & Emery LLP

(57) ABSTRACT

A computer-implemented method for comparing multiple client application variations, including, providing a copy of a client application to each of a plurality of client devices, wherein each copy of the client application comprises multiple application variations, receiving demographic information from one or more of the plurality of client devices and providing a list of available experiments to each of the plurality of client devices based on the demographic information, wherein each of the available experiments corresponds with one or more application variations. In certain implementations, the method further includes steps for receiving usage information for each copy of the client application associated with each of the plurality of client devices and comparing two or more application variations of the client application based on the usage information. Systems and computer-readable media are also provided.

17 Claims, 4 Drawing Sheets

SERVER SIDE EXPERIMENTATION FOR CLIENT SIDE SOFTWARE

CROSS-REFERENCE TO RELATED APPLICATIONS

The present application claims the benefit of priority under 35 U.S.C. §119 from U.S. Provisional Patent Application Ser. No. 61/798,507, filed on Mar. 15, 2013, the disclosure of which is hereby incorporated by reference in its entirety for all purposes.

BACKGROUND

The disclosed technology provides a method for comparing multiple features across a common application version. Specifically, the instant disclosure provides methods by which multiple variations of a client application can be tested to compare different features, configurations and parameters among the variations.

In conventional software releases, client application binaries are updated and/or replaced in order to add a new feature or to change current configurations or parameters. As such, comparisons between different features can only be made between different releases made at different points in time, making it difficult to register the direct impact any particular changes have had on client application use or user behavior.

SUMMARY

The disclosed subject matter relates to a computer-implemented method for comparing multiple client application variations, comprising, providing a copy of a client application to each of a plurality of client devices, wherein each copy of the client application comprises multiple application variations, receiving demographic information from one or more of the plurality of client devices and providing a list of available experiments to each of the plurality of client devices based on the demographic information, wherein each of the available experiments corresponds with one or more application variations. In certain aspects, the method further comprises steps for receiving usage information for each copy of the client application associated with each of the plurality of client devices and comparing two or more application variations of the client application based on the usage information.

The disclosed subject matter also relates to a system for comparing multiple client application variations, the system comprising, one or more processors and a computer-readable medium comprising instructions stored therein, which when executed by the processors, cause the processors to perform operations comprising providing a copy of a client application to each of a plurality of client devices, wherein each copy of the client application comprises multiple application variations, receiving demographic information from one or more of the plurality of client devices and providing a list of available experiments to each of the plurality of client devices based on the demographic information, wherein each of the available experiments corresponds with one or more application variations. In certain aspects the processors are further configured to perform operations for receiving usage information for each copy of the client application associated with each of the plurality of client devices, comparing two or more application variations of the client application based on the usage information and determining a preferred application variation based on the comparison of the two or more application variations.

In other implementations, the disclosed subject matter relates to a computer-readable storage medium comprising instructions stored therein, which when executed by a processor, cause the processor to perform operations comprising, providing a copy of a client application to each of a plurality of client devices, wherein each copy of the client application comprises multiple application variations, receiving demographic information from one or more of the plurality of client devices, wherein the demographic information comprises information regarding a user's use of the client application associated with the respective client device and providing a list of available experiments to each of the plurality of client devices based on the demographic information, wherein each of the available experiments corresponds with one or more application variations. In certain aspects, the method further comprises steps for receiving usage information for each copy of the client application associated with each of the plurality of client devices and comparing two or more application variations of the client application based on the usage information.

In yet other implementations, the disclosed subject matter also relates to a method for comparing multiple client application variations, comprising receiving, from a remote server, a copy of a client application on a client device, providing demographic information to the remote server, wherein the demographic information comprises one or more of language information or geographic information associated with the client application and receiving a list of available experiments based on the demographic information, wherein each of the available experiments corresponds with one or more application variations. In certain aspects the method further comprises steps for selecting, from among the available experiments, an experiment to be performed with respect to the client application and providing usage information for the client application, based on a user's engagement with the client application.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
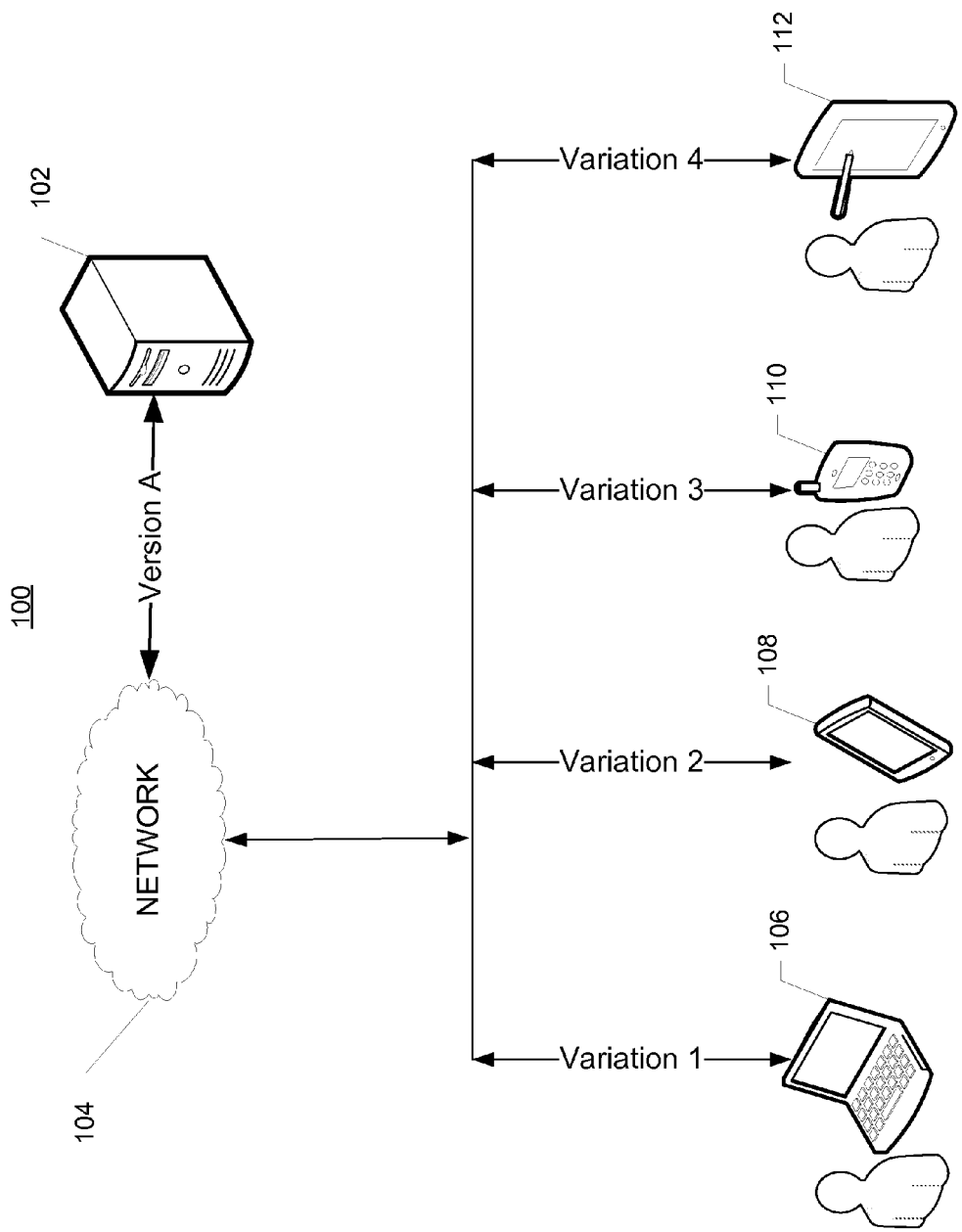
FIG. 1 illustrates a block diagram of an example system that can be used to implement some aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

Variance in user use and behavior with respect to a client application can be due to a multitude of factors, both related and unrelated to the features and configuration provided by the client application. For example, use of an application released at a time corresponding with a signification political or cultural event may be relatively low compared when with that of a release performed at another time. Because of the multitude of factors that can potentially affect how (and how much) users will engage with a client application, it can be difficult to determine what features or configurations were actually preferred by users.

Aspects of the subject technology address the above issue by providing a method for facilitating experimentation between software configurations and parameters within a common application version or release. Specifically, aspects of the subject technology provide for a client application that includes multiple application variations (e.g., "variations") associated with different configurations and features. By implementing (e.g., flagging) different variations in the client applications of separate users, different features/configurations can be provided to separate users of the same application version. For example, a first arrangement of elements in a browser application may correspond with a first variation, and a second arrangement may correspond with a second variation. Subsequently, experiments can be performed to compare the first and second variations (in the same browser version), for example, by analyzing and comparing data collected for users using the first variation with those using the second variation.

Although the possible experiments that may be performed for a particular application version are only limited by the number of variations, in certain aspects only a predetermined sub-set of all possible experiments will be available. A list of available experiments may be stored on a server accessible by the client application. In certain implementations, the client application will provide demographic information to the server to help further limit the set of available experiments. For example, the availability of a particular experiment to a particular client application may be based on the language version (or geographic region, etc.) of the client application. After the list of available experiments is determined, one or more experiments may be selected by the client application, causing the client application to be run with the features/configuration corresponding with the variation(s) associated with the selected experiment(s).

By comparing data collected from multiple client applications running different variations, inferences can be made as to the efficacy and/or desirably of certain configurations and features. Thus, the subject technology provides a means for facilitating experimentation between application features and configurations within a common application version.

FIG. 1 illustrates a block diagram of an example system 100 that can be used to implement some aspects of the subject technology. Specifically, system 100 includes remote server 102, network 104 and four user devices (106, 108, 110 and 112).

As illustrated in the example of FIG. 1, remote server 102 is communicatively coupled to each of user devices (106, 108, 110 and 112), via network 104. It is understood that any number of devices may be coupled via network 104, including one or more additional servers and/or a greater (or fewer) number of user devices.

Server 102 can be used to distribute copies of a client application to different users associated with user devices 106-112. For example, Version A of a client application can be distributed to each of user devices 106-112, via network 104. In certain implementations, each copy of client application Version A will include multiple variations. As used herein, "variation" can refer to a particular application feature or configuration, or to a combination of features/configurations. As such, different variations of the client application can correspond with different features, settings and/or configurations. By way of example, different variations can control differences in the look, behavior and/or functionality of the client application.

In certain aspects, each version of a client application can include multiple variations, each of which will affect the configuration or functionality of the client application. By way of example, a particular variation may correspond with a visual arrangement or placement of objects in a client application.

In one or more implementations, different variations for a client application will be selected. As illustrated in system 100 of FIG. 1, each of client devices 106-112 that have received Version A of the client application will run a different variation of the client application. For example, client device 106 runs Variation 1 of Version A, client device 108 runs Variation 2 of Version A, client device 110 runs Variation 3 of Version A and client device 112 runs Variation 4 of Version A. As such, each of the users associated with client devices 106-112 will experience slightly different features and/or configurations of client application Version A.

The different variations of the client application running on each of client devices 106-112 can provide the associated users with a different user experience. By way of example, each variation may provide the users with a different arrangement of visual features in the corresponding client application, for example, a browser application. Subsequently, information (e.g., "usage information") regarding the user's interaction with the client application can be collected and provided, for example, to a remote server. Usage information can include any type of information about the user, the client application (and associated variation), and/or the associated client device. In certain aspects, usage information will include data indicating the current variation and version of the client application, as well as information regarding the user's use of the client application. For example, usage information could include data related to features used by the user of the client application (e.g., types of features and frequency), and/or crash report information, etc. In some aspects, usage information may also include information regarding how a user uses a particular feature of the client application (e.g., if use of the feature involves an interface prompting the user to make a choice, the user's choice selection may be included as usage information). Additionally, usage information may include timing data related to a user's use of client application features, for example, a time duration between actions, such as, opening a new tab within a browser window.

In some implementations, usage information collected from multiple users (using different client devices running different variations of the client application), can be compared in order to perform experiments regarding different variations of the client application. By comparing different variations of the client application, various configurations, features and parameters can be compared across a single version of the client application.

Figure 2:
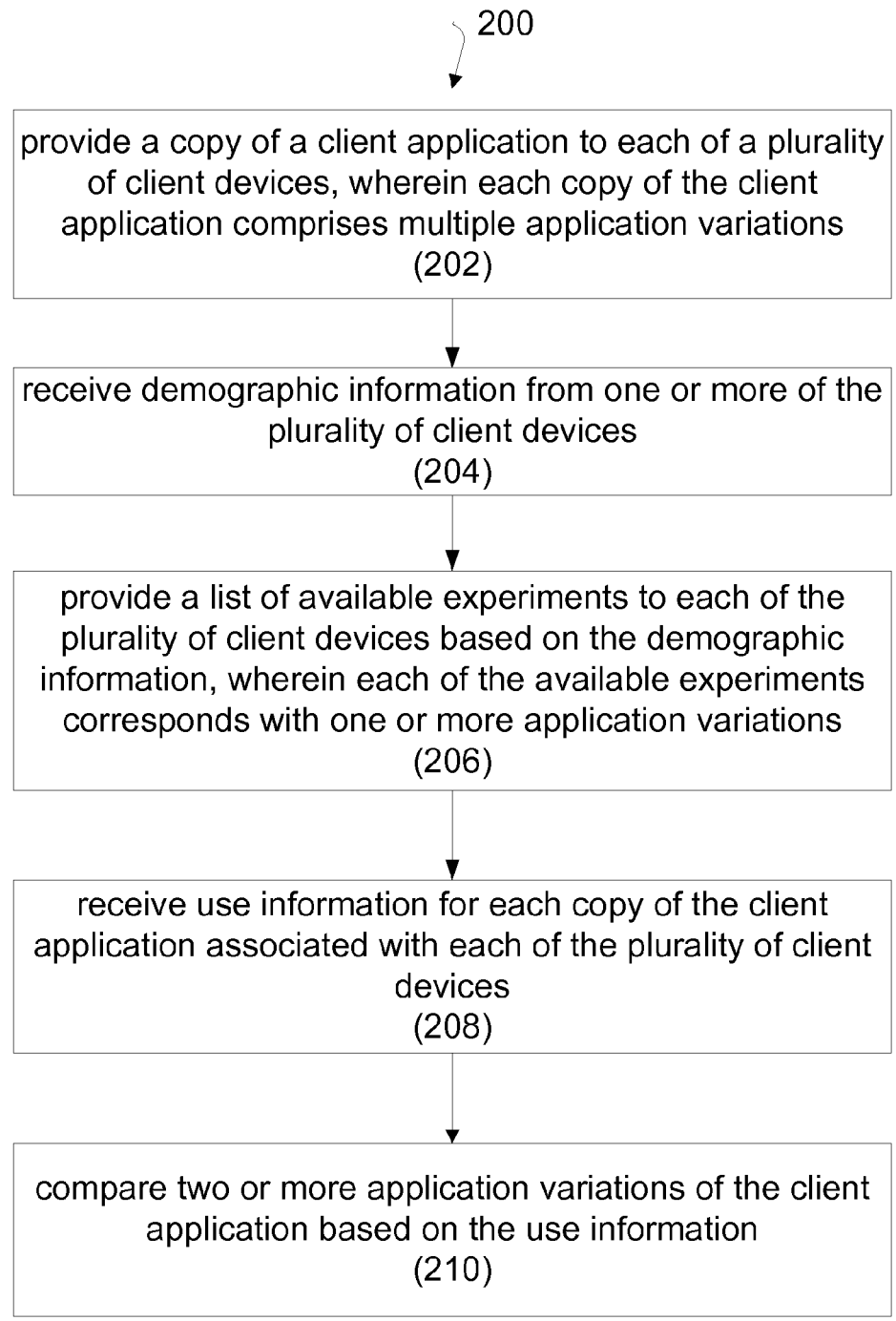
FIG. 2 illustrates an example of steps of a method for implementing certain aspects of the subject technology.

FIG. 2 illustrates an example of steps of a method 200 for implementing certain aspects of the subject technology. The method 200 begins with step 202 in which a copy of a client application is provided to each of a plurality of client devices, wherein each copy of the client application includes multiple application variations. In certain aspects, application variations may be implemented as different code-paths within the same application (e.g., the client application) such that each variation can correspond with a specific set of conditionals. As discussed above, each variation included in each of the client application copies can correspond with one or more features, configurations or parameters that can affect the look and/or behavior of the associated client application.

In step 204, demographic information is received from one or more of the plurality of client devices. Demographic information can include any information about the user and/or the client device for which the client application copy is provided (e.g., provided for download by the client device). By way of example, the demographic information can include information regarding the client device, such as operating system version information and/or information regarding hardware components of the client device, or hardware components connected to the client device. Demographic information may also include information that relates to a client application that is installed or executed on the client device. For example, demographic information may include the date on which the client application was installed and/or what version was installed, etc. In certain aspects, demographic information may also include language information for the user and/or information identifying the geographic region in which the client device resides. In some examples, the demographic information may further include information about user preferences related to the use of the client application.

In step 206, a list of available experiments is provided to each of the plurality of client devices based on the demographic information, wherein each of the available experiments corresponds with one or more application variations. As used herein "experiments" correspond with one or more selections or combinations of client software variations that can be analyzed and compared, for example, to make relative determinations as to the utility and/or desirability of certain features and/or configurations of the client application.

Because different experiments may be relevant to different users (or groups of users), the list of available experiments provided to various client devices may be different. For example, different client devices (associated with different users) will have different demographic information; as such, the list of available experiments provided to each client device may be different or unique.

Based on the list of experiments that are available to a particular user device and associated client application, a particular variation (or combination of variations) can be flagged for use by the client application. Thus, each client application copy may implement an assortment of different client application variations. The selection of a particular variation (or combination of variations) can be performed by the client application or by a remote server. For example, a client application can be configured to choose and implement a particular variation (or combination of variations) based on a list of available experiments provided by a remote server. Because the list of available experiments provided to any particular client device is based on the demographic information for that client device, client application and/or associated user, the list of available experiments can be limited to those which are relevant (or most relevant) to a particular client application and/or user. That is, the variations (or variations) that are implemented in any of the client application copies, may implement changes that are most relevant to the associated user and/or client device.

In step 208, usage information is received for each copy of the client application associated with each of the plurality of client devices. Usage information can include any information pertaining to the user's use of the client application. By way of example, if the client application is a web browser, the usage information may include data indicating how many searches were performed by the user and/or how many times the user used the web browser's "back" function. Such types of information may be relevant in assessing the user's experience with respect to the client application.

Subsequently, in step 210, two or more application variations of the client application will be compared based on the usage information. Comparisons of various application variations will correspond with one or more of the available experiments, as discussed above with respect to step 206. In some implementations, collections of experiments (e.g., "studies") may be performed with respect to multiple features and/or configurations within a common version of the client application, for example, by comparing different experiments that have been performed across multiple client application copies.

Figure 3:
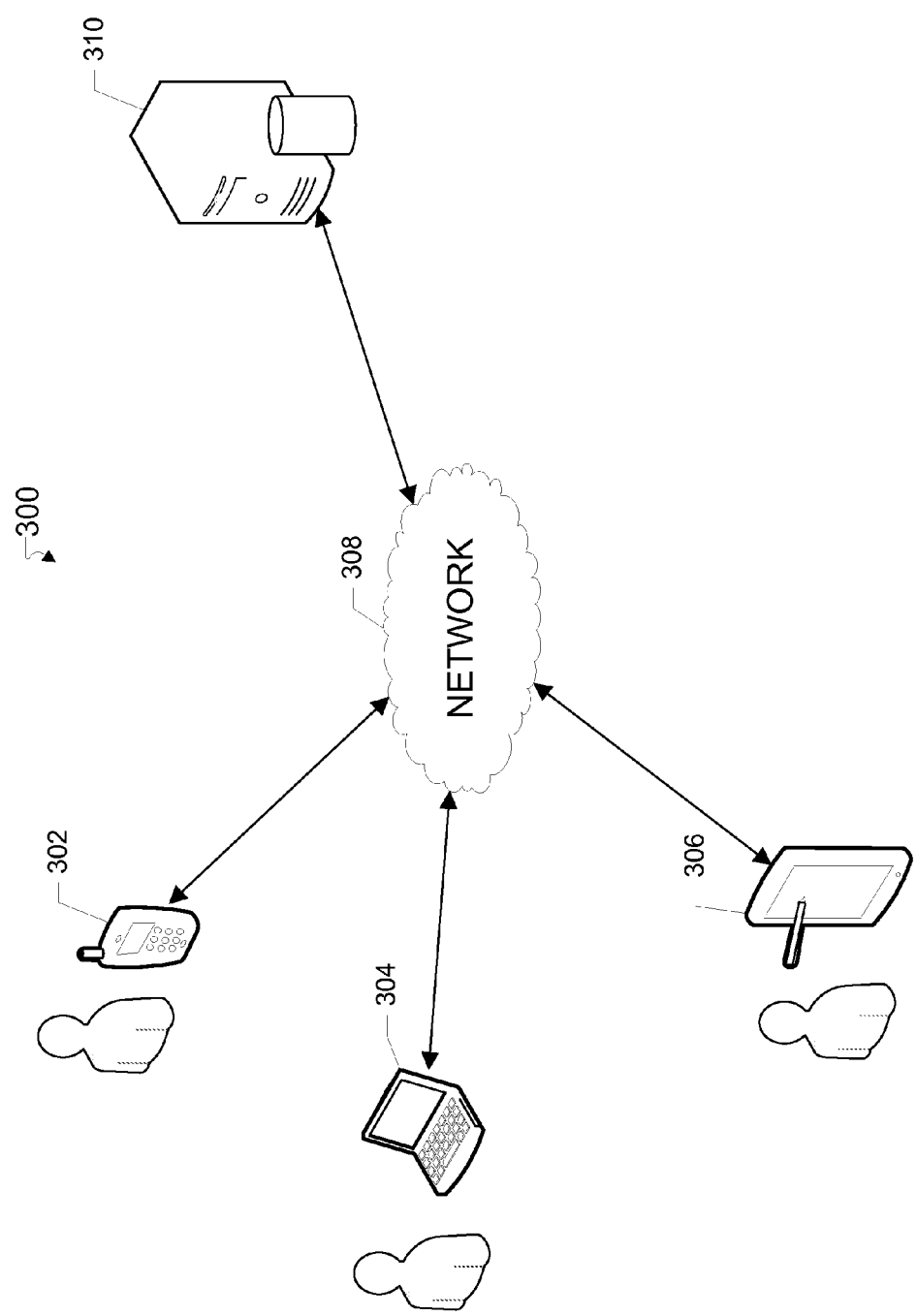
FIG. 3 illustrates an example network system that can be used to implement some aspects of the subject technology.

FIG. 3 illustrates an example network system 300 that can be used to implement some aspects of the subject technology. Specifically, network system 300 includes user devices 302, 304 and 306, network 308 and remote server 310. As illustrated, the user devices (302-306) and remote server 310 are communicatively connected via network 308. It is understood that in addition to the user devices (302-306) and remote server 310, any number of processor-based devices could be communicatively connected to network 308. Furthermore, as will be discussed in greater detail below, network 308 could comprise multiple networks, such as a network of networks, e.g., the Internet.

In some examples, one or more of the process steps of the subject technology can be carried out by one or more of the user devices 302-306, and remote server 310, over network 308. By way of example, remote server 310 could be configured to provide a copy of a client application to each of a plurality of client devices (e.g., user devices 302-306), wherein each copy of the client application comprises multiple application variations. Additionally, remote server 310 can be configured to receive demographic information from one or more of the plurality of user devices 302-306 and to provide a list of available experiments to each of the plurality of the user devices 302-306 based on the demographic information, wherein each of the available experiments corresponds with one or more application variations. Remote server 310 can also be configured to receive (e.g., via network 308) usage information for each copy of the client application associated with each of the user devices 302-306 and to compare two or more application variations of the client application based on the usage information. In certain implementations, remote server 310 may be further configured to determine a preferred application variation based on the comparison of the two or more application variations.

Figure 4:
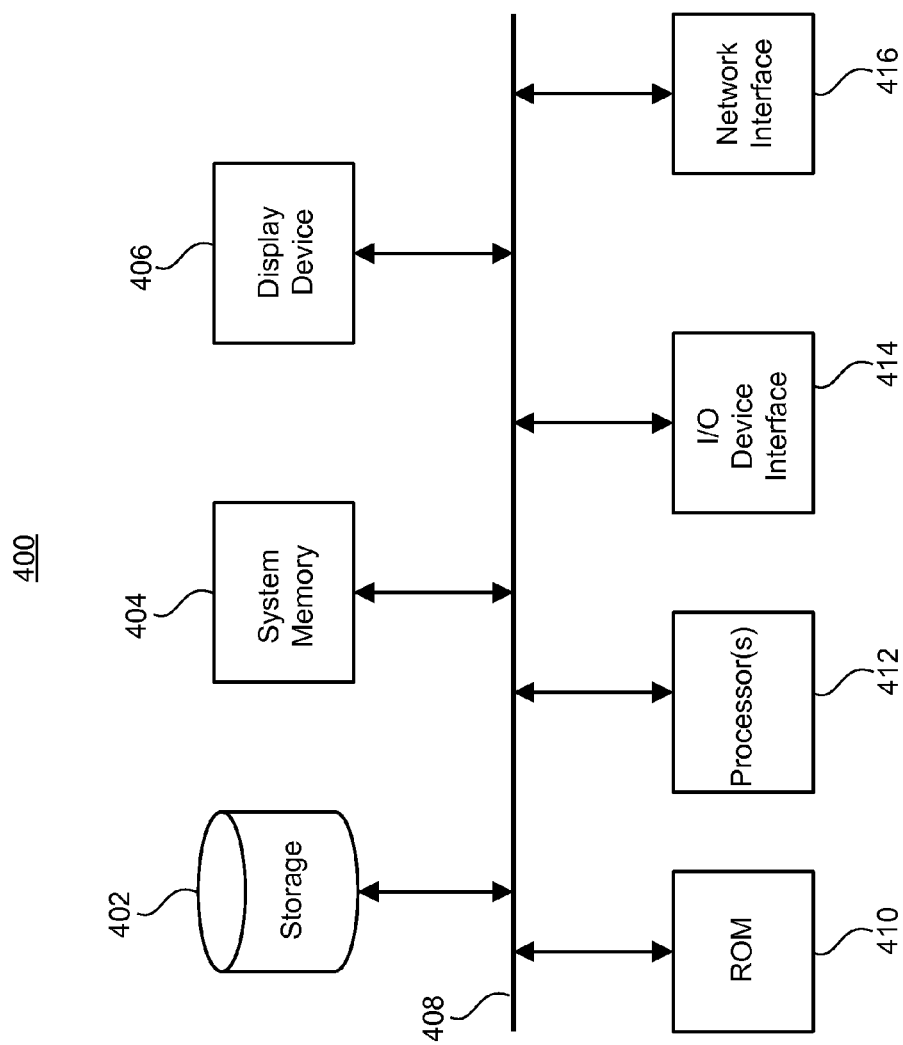
FIG. 4 illustrates an example of an electronic system with which some aspects of the subject technology can be implemented.

FIG. 4 illustrates an example of an electronic system 400 with which some aspects of the subject technology can be implemented. In some examples, electronic system 400 can be a single computing device such as a server, e.g., remote server 310, discussed above. Furthermore, in some implementations, electronic system 400 can be operated alone or together with one or more other electronic systems e.g., as part of a cluster or a network of computers.

As illustrated, electronic system 400 comprises storage 402, system memory 404, output device interface 406, system bus 408, ROM 410, processor(s) 412, input device interface 414 and a network interface 416. In some aspects, system bus 408 collectively represents all system, peripheral, and chipset buses that communicatively connect the numerous internal devices of the electronic system 400. For instance, system bus 408 communicatively connects the processor(s) 412 with the ROM 410, the system memory 404, the output device interface 406 and the permanent storage device 402.

In some implementations, the various memory units, the processor(s) 412 retrieve instructions to execute (and data to process) in order to execute the steps of the subject technology. Processors(s) 412 can be a single processor or a multi-core processor in different implementations. Additionally, the processor(s) can comprise one or more graphics processing units (GPUs) and/or one or more decoders, depending on implementation.

ROM 410 stores static data and instructions that are needed by processor(s) 412 and other modules of electronic system 400. Similarly, processor(s) 412 can comprise one or more memory locations such as a CPU cache or processor in memory (PIM), etc. Storage device 402, is a read-and-write memory device. In some aspects, this device can be a non-volatile memory unit that stores instructions and data even when electronic system 400 is without power. Some implementations of the subject disclosure can use a mass-storage device (such as solid state, magnetic or optical storage devices) e.g., a permanent storage device 402.

Other implementations can use one or more a removable storage devices (e.g., magnetic or solid state drives) such as permanent storage device 402. Although the system memory can be either volatile or non-volatile, in some examples the system memory 404 is a volatile read-and-write memory, such as a random access memory. System memory 404 can store some of the instructions and data that the processor needs at runtime.

In some implementations, the processes of the subject disclosure are stored in system memory 404, permanent storage device 402, ROM 410 and/or one or more memory locations embedded with the processor(s) 412. From these various memory units, processor(s) 412 retrieve instructions to execute and data to process in order to execute the processes of some implementations of the instant disclosure.

Bus 408 also connects to the input device interface 414 and output device interface 406. The input device interface 414 enables a user to communicate information and select commands to the electronic system 400. Input devices used with the input device interface 414 may include for example, alphanumeric keyboards and pointing devices (also called "cursor control devices") and/or wireless devices such as wireless keyboards, wireless pointing devices, etc.

Finally, as shown in FIG. 4, bus 408 also communicatively couples the electronic system 400 to a network (not shown) through a network interface 416. It is be understood that the network interface 416 can be either wired, optical or wireless and may comprise one or more antennas and transceivers. In this manner, the electronic system 400 can be a part of a network of computers, such as a local area network ("LAN"), a wide area network ("WAN"), or a network of networks, such as the Internet (e.g., the network 310, as discussed above).

In practice the methods of the subject technology can be carried out by the electronic system 400. In some aspects, instructions for performing one or more of the method steps of the present disclosure will be stored on one or more memory devices such as the storage 402 and/or the system memory 404.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A method for comparing multiple client application variations, comprising:

providing, from a server, a copy of a client application to each of a plurality of client devices, wherein each copy of the client application comprises multiple application variations;

receiving, at the server, demographic information from one or more of the plurality of client devices;

providing, from the server, a list of available experiments to each of the plurality of client devices based on the demographic information, wherein each of the available experiments corresponds with one or more application variations;

receiving, at the server, usage information for each copy of the client application associated with each of the plurality of client devices; and comparing, by the server, two or more application variations of the client application based on the usage information; and receiving, at the server, from the client application, a preferred application variation based on the comparison of the two or more application variations, wherein different configurations are provided to different users of a same client application version based on flagging variations in the client applications of the different users.

2. The method of claim 1, wherein each of the application variations correspond with one or more different features of the client application.

3. The method of claim 1, wherein each of the application variations corresponds with one or more different configurations of the client application.

4. The method of claim 1, wherein the demographic information comprises one or more of language information or geographic information of an associated client application.

5. The method of claim 1, wherein the usage information comprises an indication of the application variation running on the associated client device.

6. A system for comparing multiple client application variations, the system comprising:

one or more processors; and a computer-readable medium comprising instructions stored therein, which when executed by the processors, cause the processors to perform operations comprising:

providing a copy of a client application to each of a plurality of client devices, wherein each copy of the client application comprises multiple application variations;

receiving demographic information from one or more of the plurality of client devices;

providing a list of available experiments to each of the plurality of client devices based on the demographic information, wherein each of the available experiments corresponds with one or more application variations;

receiving usage information for each copy of the client application associated with each of the plurality of client devices;

comparing two or more application variations of the client application based on the usage information; and receiving, from the client application, a preferred application variation based on the comparison of the two or more application variations, wherein different configurations are provided to different users of a same client application version based on flagging variations in the client applications of the different users.

7. The system of claim 6, wherein each of the application variations corresponds with one or more different features of the client application.

8. The system of claim 6, wherein each of the application variations corresponds with one or more different configurations of the client application.

9. The system of claim 6, wherein the demographic information comprises one or more of language information or geographic information of an associated client application.

10. The system of claim 6, wherein the usage information comprises an indication of the application variation running on the associated client device.

11. A non-transitory computer-readable storage medium comprising instructions stored therein, which when executed by a processor, cause the processor to perform operations comprising:
provining different features of the same client application version to each of a plurality of client devices based on flagging variations of the client application of the plurality of client devices that are associated with the experiment to be performed;
receiving demographic information from one or more of the plurality of client devices, wherein the demographic information comprises information regarding a user's use of the client application associated with the respective client device;
providing a list of available experiments to each of the plurality of client devices based on the demographic information, wherein each of the available experiments corresponds with one or more application variations, wherein the list of available experiments provided to one of the plurality of client devices is different than the list of available experiments provided to another of the plurality of client devices;
receiving usage information for each copy of the client application associated with each of the plurality of client devices; and
comparing two or more application variations of the client application based on the usage information.

12. The non-transitory computer-readable storage medium of claim 11, wherein each of the application variations corresponds with one or more different features of the client application.

13. The non-transitory computer-readable storage medium of claim 11, wherein each of the application variations corresponds with one or more different configurations of the client application.

14. The non-transitory computer-readable storage medium of claim 11, wherein the demographic information comprises one or more of language information or geographic information of an associated client application.

15. The non-transitory computer-readable storage medium of claim 11, further comprising:
determining a preferred application variation based on the comparison of the two or more application variations, wherein the determining the preferred application variation is performed by a remote server.

16. A method for comparing multiple client application variations, comprising:
receiving, from a remote server, a copy of a client application on a client device;
providing demographic information to the remote server, wherein the demographic information comprises one or more of language information or geographic information associated with the client application;
receiving a list of available experiments based on the demographic information, wherein each of the available experiments corresponds with one or more application variations;
selecting, from among the available experiments, an experiment to be performed with respect to the client application;
providing usage information for the client application, based on a user's engagement with the client application; and
comparing two or more application variations of the client application based on the usage information; and
providing different features of the same client application version to different users based on flagging variations of the client application of the different users that are associated with the experiment to be performed.

17. The method of claim 1, wherein the list of available experiments provided to a particular one of the plurality of client devices is based on the demographic information for that particular client device.

* * * * *